(12) United States Patent
Høydahl Sørli (10) Patent No.: US 12,196,642 B2
(45) Date of Patent: Jan. 14, 2025

(54) GAS LEAKAGE METER

(71) Applicant: INLINE TEST AS, Molde (NO)

(72) Inventor: Jan Gregor Høydahl Sørli, Molde (NO)

(73) Assignee: INLINE TEST AS, Molde (NO)

( * ) Notice: Subject to any disclaimer, the term of this patent is extended or adjusted under 35 U.S.C. 154(b) by 388 days.

(21) Appl. No.: 17/787,373

(22) PCT Filed: Dec. 18, 2020

(86) PCT No.: PCT/NO2020/050322
§ 371 (c)(1),
(2) Date: Jun. 20, 2022

(87) PCT Pub. No.: WO2021/125976
PCT Pub. Date: Jun. 24, 2021

(65) Prior Publication Data
US 2022/0373423 A1    Nov. 24, 2022

(30) Foreign Application Priority Data

Dec. 21, 2019 (NO) .................................... 20191522

(51) Int. Cl.
| | |
|---|---|
| *G01M 3/06* | (2006.01) |
| *G01M 3/28* | (2006.01) |
| *G01M 3/32* | (2006.01) |

(52) U.S. Cl.
CPC ............ *G01M 3/06* (2013.01); *G01M 3/2807* (2013.01); *G01M 3/2876* (2013.01); *G01M 3/3254* (2013.01)

(58) Field of Classification Search
CPC .... G01M 3/06; G01M 3/2807; G01M 3/2876; G01M 3/3254
See application file for complete search history.

(56) References Cited

U.S. PATENT DOCUMENTS

| | | | |
|---|---|---|---|
| 3,624,627 A | 11/1971 | Evans | |
| 4,492,110 A * | 1/1985 | Bergquist | ............. G01M 3/202 250/288 |

(Continued)

FOREIGN PATENT DOCUMENTS

| | | |
|---|---|---|
| CN | 208902348 | 5/2019 |
| JP | S5514510 U | 1/1980 |
| JP | H04231835 | 8/1992 |

OTHER PUBLICATIONS

International Search Report Issued in PCT/NO2020/050322, Mar. 19, 2021, pp. 1-3.

(Continued)

*Primary Examiner* — Eric S. McCall
(74) *Attorney, Agent, or Firm* — Jeffrey S. Melcher; Melcher Patent Law PLLC (57) ABSTRACT

A gas leakage meter (100) for use onsite in a process plant comprises a housing (110) with an inlet (101), an outlet (102) and an inlet nozzle (111) fluidly connected to a unit to be tested (3) through a downstream connector (1040) and to the inlet (101), the housing (110) being filled with a liquid to a level (10). An inclined pipe (120) is arranged such that, in use, test gas released from the inlet nozzle (111) raises through a liquid and the inclined pipe (120) to a gas-collecting chamber (122) at an upper end of the inclined pipe. (120). The gas-collecting chamber (122) has a gas release valve (150; 170) for releasing test gas before a test period. Embodiments where the inclined pipe (120) is mounted on a pivot and alternative gas release valves (150, 170) are also disclosed.

15 Claims, 4 Drawing Sheets

(56) References Cited

U.S. PATENT DOCUMENTS

| | | | |
|---|---|---|---|
| 2007/0044549 A1* | 3/2007 | Yoshioka | F02M 25/0809 73/114.38 |
| 2008/0202212 A1* | 8/2008 | Liepert | G01M 3/205 73/40.7 |
| 2013/0276517 A1* | 10/2013 | Takano | G01M 3/16 73/40.5 R |
| 2023/0273087 A1* | 8/2023 | Wetzig | G01M 3/229 73/40 |

OTHER PUBLICATIONS

Written Opinion Issued in PCT/NO2020/050322, Mar. 19, 2021, pp. 1-6.

* cited by examiner

GAS LEAKAGE METER

BACKGROUND

The present invention concerns a gas leakage meter for use onsite in a process plant.

In this document, a leak is an undesired flow of gas or liquid through a barrier to or from the atmosphere. The barrier is part of a unit to be tested. For example, the barrier may be a wall or seal, and the unit to be tested may be a valve, a pipe or an assembly of components.

Standards and specifications usually describe pressure tests with acceptable limits for leaks as function of pressure applied over a barrier. We consider test gas, not liquid, as pressure medium. The test gas may be air or an inert gas such as nitrogen ($N_2$). Test pressures may range from less than 1 atm for a vacuum unit to be tested to tens of bars applied over a seal or wall of a large valve or pipe. Inert gas may be mandatory in some areas, hereinafter Ex-areas, for example because the content of oxygen in pressurized air, e.g. at partial pressure 0.21 times 5 or 50 bars, increases an explosion hazard beyond acceptable limits.

US Statutory Invention Registration no. H1045 (Wilson, 1992) describes an early example of a test device using a principle now commonly called bubble counting. Wilson's test device comprises a housing coupled between an upstream source of pressurized air and a downstream unit to be tested. An upstream fluid circuit for regulating air pressure includes a pressure valve shortly upstream from the housing. In use, a leak causes a small flow of air to enter liquid in the housing through a small orifice. A light source and light detector detect bubbles as they raise through the liquid. If a flow rate is desirable, an optional shunt valve downstream from the housing may divert the leak through a shunt line to a manometer. A U-shaped water trap illustrates the manometer on the shunt line.

Bubble counting remains a widely used method to detect and quantify leaks, and commercially available bubble detectors or bubble counters fill the function of the "light source and light detector" in Wilson's test device. A modern bubble counter may be an optical device including a LED laser, a collimating lens and a light detector. Alternatively, the bubble counter may use electrical properties such as conductivity, resistance or capacitance, all of which are significantly different in a gas and a liquid. Either way, bubble counters and similar devices have standard interfaces to facilitate integration in a larger system. Bubble counters as such are commodity devices that need no detailed description herein.

So-called air decay testing provides an alternative to bubble counting. This method typically starts with filling the unit to be tested and a reference volume with pressurized test gas from a mutual source. After a stabilizing period, the test gas is stable at ambient temperature and a test period begins. At the end of the test period, a pressure sensor measures a pressure difference between the reference volume and the unit to be tested.

In this document, we use the term 'sensor' in a broad, functional sense meaning a device able to represent a physical parameter, in particular pressure or force, by means of one or more other physical parameter(s). Such devices are also called 'transducers'. Internal working principles are irrelevant. For example, a pressure sensor may contain a column of liquid with known density, and actually measure liquid levels. The output from this pressure sensor may be liquid level as such, e.g. representing the pressure directly in units of mm $H_2O$, or electrical current or voltage proportional to level and thereby pressure. Pressure and force sensors include MEMS devices. Pressure and force sensors in this broad functional sense are commercially available, and thus need no detailed explanation herein.

A main purpose of the proposed leakage meter is to detect and quantify gas leaks less than a few ml ($cm^3$) per minute by any practical method. In particular, practical methods are not limited to bubble counting or air decay testing.

For context and later numerical examples, we borrow a definition and some limits from API standard 598 related to valve testing. API standard 598 defines 1 bubble=$\frac{1}{16}$ ml, and maximum permitted leaks<1 bubble, 24 bubbles (1.50 ml), 40 bubbles (2.50 ml) and 56 bubbles (3.50 ml) per minute for different valve classes. These values apply at 'standard temperature and pressure', STP. For order's sake, we remark that API standard 598 was withdrawn in 2009, and that similar definitions and limits appear in current standards.

Some additional purposes need further explanation. Starting upstream, unexpectedly large leaks may cause pressures or flows of test gas that are greater than design values for the leakage meter. In extreme cases, test gas may blow liquid out of a housing, a water trap, etc. The pressure valve upstream from the housing in Wilson's test device may obviously be opened slowly and carefully to avoid such extreme flows. Similarly, automatic control valves and/or pressure reduction valves upstream from a leakage meter can open slowly to keep liquid within a housing, a water trap etc.

There is a desire to estimate less extreme flows that are still greater than design parameters, for example up to ten times the maximum flow rate of the leakage meter. The estimates should preferably be reasonably accurate, performed in real time and not involve expensive equipment. In particular, this may exclude commodity flow meters, which typically are relatively inaccurate, require test periods 30 seconds or more, or are relatively expensive.

Small bubbles and bubble trains illustrate problems of accuracy seen in practical applications. At low leaks, an inlet or orifice may release bubbles significantly smaller than a 'standard' bubble. A volume $\frac{1}{16}$ ml corresponds to a sphere with diameter 4.92 mm, and some standards specify tubes or pipes with this approximate diameter at the bubble counter. However, a bubble counter monitoring a conduit with inner diameter about 5.0 mm may count a smaller bubble following the conduit as a full-sized bubble, and thereby cause a false positive or false alarm.

Conversely, a bubble train contains more than one standard bubble. It is usually unclear whether bubble trains at low leaks are caused by adhesion upstream of the inlet orifice or some systematic fault in the unit to be tested. Systematic and accurate experiments is the only way to determine the cause of bubble trains. Conventional bubble counters are unable to assess the amount of test gas in a bubble train accurately. Counting too few bubbles is the same as underestimating the leak, and may cause false negatives, that is, undetected faults.

Cameras gradually replace conventional bubble counters in some applications, in part due to increasing camera resolution and decreasing prices. A simple line scanner may detect the start and end of a gas volume within a tube. Assuming a continuous gas volume filling the tube, the estimated gas volume simply becomes the time difference multiplied by a speed and the cross sectional area of the tube. In practice, gas volumes are not necessarily continuous. More sophisticated camera techniques essentially add several smaller and separate gas volumes, sometimes aided by continuity between subsequent video frames. Further, some of these techniques operate in a frequency domain as opposed to the time-space domain. Confidence in the resulting gas volume may be an issue with these methods, as there are numerous sources of systematic errors. Either way, technology used in conventional and camera based bubble counters as such is beyond the scope of the present invention.

For further context and later reference, we take a quick detour to describe a few typical external systems and methods that might use the proposed leakage meter.

Many current quality control (QC) systems use Ishikawa's seven basic tools of QC because these tools are easy to understand for people without formal training in statistics, and because they are estimated to solve 85-95% of QC problems occurring in any setting. One tool is a run chart, which displays a parameter at fixed intervals. Another tool is an Ishikawa diagram, which relates a fault to causes in clearly defined categories.

Traditionally, statistical process control (SPC) controls output from a manufacturing process depending on changes in 5M&E conditions (Man, Machine, Material, Movement, Method & Environment). Among other things, SPC uses statistics to avoid costly post mortem repairs and unnecessary replacement of usable equipment. In a process plant, (part of) SPC may be utilized to plan maintenance and replacement of equipment such as valves, pipes etc. depending on pressure tests. SPC uses some of the seven basic QC tools, including run charts and Ishikawa diagrams with 5M&E categories. Measurements may be a source of false positives ('false alarms') and false negatives (undetected faults), so 'measurement' replaces 'movement' in some Ishikawa diagrams for SPC.

A Kalman filter (KF) computes a weighted sum of a prediction based on physical laws and a set of measurements. The resulting estimates are more accurate than predictions alone and measurements alone. A common form of the KF runs the prediction step at high frequency and computes the weighted sum whenever a measurement becomes available.

This is similar to a traditional navigation system, which estimates a position based on heading and speed until a position can be fixed, e.g. by triangulating landmarks. In terms of control theory, a system can run open loop until a sensor closes the control loop.

We refer the interested reader to online sources and literature for further references to systems, methods and keywords in the past three paragraphs.

The external systems just described benefit from leak measurements during a test period, not just a 'pass or fail' measurement at the end of the test period. Leak measurements may be more or less 'accurate' in the sense precise, verifiable and repeatable.

The proposed leakage meter is intended for use outdoors, where ambient conditions, in particular temperature and humidity vary more widely and change faster than indoors conditions in a lab or a workshop. This is not necessarily a problem as long as factors affecting the measurements are known. However, it is desirable to keep dependencies on ambient conditions to a minimum.

Consider, for example, a pressure transducer using a column of liquid as sensing element. The height of the liquid column depends on temperature through liquid density, but does not depend on humidity or other factors. Further, any lab may calibrate such a pressure transducer by means of a specified liquid such that its density may be determined to any desired precision and resolution. For example, distilled (pure) water is available in any lab, and its density to two decimals in SI units at a resolution of 1 K is available from online sources, for instance 1000.00 kg/m$^3$ at 4° C. and 997.76 kg/m$^3$ at 22° C.

For comparison, different electronic pressure sensors have different dependencies on temperature, typically in the range 0.1-0.2% per K. Electronic force sensors may have similar temperature dependencies, and some sensors may have hysteresis, i.e. different response to increasing and decreasing temperature, pressure, force etc. Electronic pressure and force sensors of particular models or makes are not available at an arbitrary lab, so each leakage meter containing one or more such components might need its own calibration curve(s) depending on temperature and perhaps other factors. In contrast, equipment designed for narrow ranges of temperatures, pressures and humidity may simply have a specified uncertainty, and do not necessarily need calibration curves covering wider ranges.

In terms of quality control, a design with multiple sensors depending on the ambient environment require extra effort for calibration and documentation. In addition, the number of error sources, and thereby potential measurement faults, grow quickly with the number of such sensors.

In general, relative errors decrease with increasing size of a measured parameter. For example, the precision of leak measurements increases with the duration of test periods. Some standards specify minimum test periods for some tests, e.g. ranging from 15 to 600 s. It is desirable to keep these periods as short as possible, yet fulfil minimum durations and achieve a desired precision.

While liquid columns as such are insensitive to ambient conditions apart from temperature, pipe sizes determine whether gauges using them are practical or not. For example, a maximum permitted leak 3.5 ml/min×3 minutes becomes 10.5 ml. This gas volume displaces approximately 10.5 ml liquid in a vertical pipe, which corresponds to a height 53.5 cm if the inner pipe diameter is 5.0 mm. An inner diameter 1.0 cm reduces the height of the liquid column to 13.4 cm, which is still tall for a portable leakage meter. However, taller columns give better precision. For example, a height resolution±0.5 mm with the columns above give: ±0.5/535=±0.09% and ±0.5/134=±0.4%, respectively.

Conversely, $\frac{1}{16}$ ml corresponds to 3.2 mm liquid column in a 5 mm pipe. With the resolution from the previous paragraph, the relative error increases to ±0.5/3.2=±15.7%. In this case, a vertical pipe with inner diameter less than 5 mm would be better.

In practice, the number of available slots in a control panel may limit the number of electronic sensors in real embodiments of the leakage meter. Specifically, electronic sensors as such tend to be relatively small and light, whereas the size and weight of a large control panel with many PLCs for connecting the sensors may easily limit the portability of a trolley.

A main objective of the present invention is to fulfil at least one of the mentioned purposes and/or solve or alleviate at least one of the mentioned problems while retaining benefits from prior art. A more particular objective is to provide an improved and robust portable leakage meter producing accurate estimates for leaks at different test pressures and for different units to be tested.

SUMMARY OF THE INVENTION

These objectives are achieved by a leakage meter according to claim 1. Further features and benefits appear in the dependent claims. In the claims, we follow the convention that articles 'a', 'an' and 'the' mean '(the) at least one', whereas 'one' means 'exactly one'.

More particularly, the invention concerns a gas leakage meter for use onsite in a process plant comprising a housing with an inlet, an outlet and an inlet nozzle fluidly connected to the inlet. The gas leakage meter is distinguished by an inclined pipe arranged such that, in use, test gas released from the inlet nozzle raises through a liquid and the inclined pipe to a gas-collecting chamber at an upper end of the inclined pipe. The gas-collecting chamber has a gas release valve for releasing test gas before a test period.

During operation, the gas-collecting chamber in the upper end of the inclined pipe collects test gas, in particular a sudden release of gas from the inlet nozzle during the test period. Normally, the gas-collecting chamber is filled with liquid before each test period, but this is not mandatory. The inclined pipe enhances coalescence of test gas, in part due to adhesion between gas and internal pipe walls. Coalescence prevents tiny amounts of test gas, that is, amounts that are below the resolution of the leakage meter, to pass undetected. The inclined pipe may comprise additional means to enhance coalescence, e.g. studs.

Ideal gas laws approximate conditions in a real test gas sufficiently well to be used in all embodiments of the gas leakage meter to convert estimated or measured test gas volumes to a leak at 'standard temperature and pressure' (STP) as defined in a pertinent test standard.

The gas leakage meter may comprise an internal environment conditioner, that is, means to regulate temperature, pressure and possibly other parameters within the housing. This minimizes adverse effects of atmospheric conditions rather than correcting for them by means of calibration curves.

Some embodiment of the gas leakage meter comprise a bubble counter configured to count bubbles of test gas within the inclined pipe. In normal use, the inner diameter of the inclined pipe defines a bubble diameter. The bubble count and bubble size gives a gas volume with resolution of one bubble size, e.g. 62.5 µl=1/16 ml or the 4.2 µl in a 2 mm sphere. Coalescence into bubbles of resolution size is particularly important in these embodiments to avoid false positives, i.e. counting undersized bubbles as full sized bubbles.

If or when a bubble train or burst of test gas arrives, the gas-collecting chamber contains the bubble train long enough to estimate its gas volume. This may be achieved by a control loop comprising a suitable electronic sensor and an actuator for the gas release valve, e.g. in the form of a commercially available solenoid valve.

Embodiments with a bubble counter may comprise a water trap connecting the gas-collecting chamber to a vertical pipe. In use, the vertical pipe contains a liquid column with a liquid level proportional to the overpressure and to the gas volume within the gas-collecting chamber. A level indicator may be configured to measure the liquid level in the vertical pipe. Alternatively, an operator can register the liquid level as in similar pressure gauges.

In embodiments with a bubble counter, the gas release valve may comprise a pilot chamber with a permanently open refill opening, a liquid release orifice in the bottom of the pilot chamber and a filling pipe connecting the pilot chamber to a first seat. A float is able to close the first seat if a buoyancy acting on the float is less than a threshold value and able to lift a valve element from a second seat if the buoyancy is equal to or greater than the threshold value. The idea is that a bubble train or burst of test gas removes buoyancy such that the float and the valve element fall short distances onto their respective seats to keep test gas in the gas-collecting chamber. In this state, liquid entering through the liquid release orifice fills the gas volume slowly enough to enable measurement or estimation of the gas volume in the gas burst or bubble train. The gas release valve with a float is an alternative to the solenoid valve in a control loop from a previous example.

Alternative embodiments of the gas leakage meter lack a bubble counter. Instead, they comprise a lever with a short arm extending toward a lower end of the inclined pipe and a long arm extending toward the gas-collecting chamber. These embodiments further comprise a force sensor configured to measure a buoyancy caused by test gas in the gas-collecting chamber.

Regardless of internal working principle, the force sensor produces a signal representing force. Common force sensors use Hooke's law and actually measure a displacement. The underlying assumption is that elastic deformation is approximately proportional to applied force. For a spring in one dimension, the ratio between force and extension is the spring constant, also called the spring rate. For a general three-dimensional elastic element, e.g. a beam, a stiffness tensor with constant elements connects strain to stress.

The force sensor may be located at the short arm of the lever. Then, a lever ratio equal to the length of the long arm divided by the length of the short arm amplifies the buoyancy force caused by test gas displacing liquid from the gas-collecting chamber. A suitable force sensor may measure strain or displacements orders of magnitude smaller than the length of the short lever arm. Alternatively, it is possible to measure spring extensions in approximately the same order of magnitude as the lengths of the lever arms.

Alternatively, the force sensor may be located at the long arm of the lever. Since the large force at the short arm corresponds to a large displacement at the long lever arm, a spring extension may suitably represent the buoyancy at the long lever arm. Indeed, if the force sensing element is a spring with extension in approximately the same order of magnitude as the lever arms, the extension may favorably be measured at the long arm regardless of whether the spring is attached to the short arm or the long arm.

Embodiments of the gas leakage meter with a lever arm may further comprise means to cancel the weight of the gas-collecting chamber at the start of each test period. Electronic force sensors may implement this as a tare weight in a number of ways.

Independently of whether the sensors are electronic or not, the means to cancel the weight of the gas-collecting chamber may be an adjustment nut able to move a spring axially and/or to provide a spring bias by means of the spring.

In addition or alternatively, the means to cancel the weight of the gas-collecting chamber may be a counter weight axially movable along the short arm of the lever. In practice, there is hardly a need for both an adjustment nut and a counter weight. However, the combination is possible, at least in principle.

The adjustment nut and/or counter weight are preferably rotatable on fine threads such that rotation causes minute axial motion. It is understood that the weight of the gas-collecting chamber, e.g. filled with liquid and immersed in liquid at the start of each test period is a force, not a mass. Furthermore, expected amounts of liquid displaced by test gas during each test period determine limits for the calibration by means of the adjustment nut and/or the counter weight.

Some embodiments of the gas leakage meter comprise a flow divider having a first manifold chamber fluidly connected to the inlet nozzle and a second manifold chamber fluidly connected to a bypass pipe outside the housing. The flow divider further comprises a dividing disc with an open section; wherein the dividing disc has several discrete angular orientations relative to the manifold chambers such that, in use, the ratios of test gas flowing through the open section into the first and second manifold chambers are clearly defined.

The discrete angular orientations may be determined by grooves and associated protrusions at fixed angular positions between the dividing disc and a raceway around the manifold chambers. The protrusions can be pins or loose balls. The dividing disc may be attached to a shaft in a sleeve to prevent that the diving disc tilts with respect to the manifold chambers. This is especially important if the protrusions, e.g. loose balls, can fall out between the dividing disc and the raceway.

The gas release valve of the gas-collecting chamber may have a rotatable valve element with an eccentric pin attached to a spring. The spring provides a first torque $a_1F_1$ keeping the gas release valve open when the eccentric pin is located on a first side of the valve element's axis of rotation. The spring further provides a second torque $a_2F_2$ keeping the gas release valve closed when the eccentric pin is located on a side opposite the first side of the valve element's axis of rotation.

Since the spring keeps this gas release valve open or closed, the energy required to operate this bi-stable valve reduces to the work needed to overcome a limited spring force over a short distance separating the two stable states. Thus, it is possible to operate the bi-stable valve at low power, e.g. supplied from a battery through a low-power inductive actuator. Inductive couplings do not require wires from the housing to the gas release valve, which might affect weight measurements. Thus, the bi-stable gas release valve may be a viable alternative to standard solenoid valves and/or the buoyancy based valve.

BRIEF DESCRIPTION OF THE DRAWINGS

The invention will be described in greater detail with reference to the accompanying drawings, in which.

DETAILED DESCRIPTION OF PREFERRED EMBODIMENTS

The drawings are schematic and not to scale. Several details known to the skilled person are omitted from the drawings for clarity of illustration.

Figure 1:
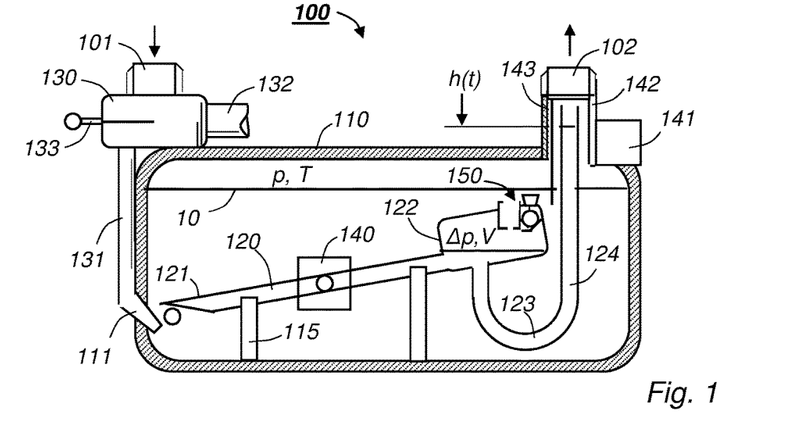
FIG. 1 illustrates a first embodiment of a leakage meter according to the invention.
Figure 12:
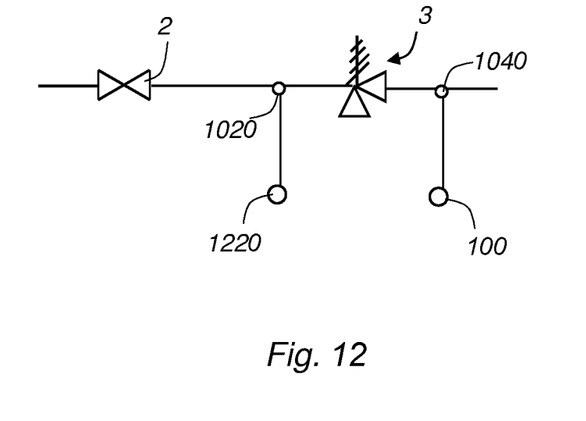
FIG. 12 overall system

The present invention concerns a gas leakage meter for use onsite in a process plant. FIG. 12 shows how a leakage meter 100 is connected to a unit to be tested 3 that is part of a process plant. When closed, the upstream isolation valve 2 isolates the unit to be tested 3 from the process plant without demounting it. A pressure source 1220 is connected to an upstream connector 1020. The pressure source 1220 contains test gas and its pressure can be regulated. The leakage meter 100 is connected to the downstream connector 1040. FIG. 1 shows the leakage meter 100 with an inlet 101, an outlet 102 and a housing 110. The inlet 101 is connected to the downstream connector 1040. For illustration, the inlet 101 and outlet 102 have external threads for connection to external tubing (not shown). External threads is one of several standard connecting means. The outlet 102 does not need connection means to release test gas to the atmosphere.

The housing 110 has an inlet nozzle 111 in the lower left of FIG. 1. The inlet nozzle 111 has an orifice that is sufficiently wide to avoid significant drops in temperature and pressure during operation. A liquid level 10 illustrates that the housing 110 contains liquid during operation. Suitable liquids include water, some alcohols and mixtures thereof. For example, glycol added to water lowers the freezing point from 0° C. We describe heating as an alternative with reference to FIG. 5. A gas volume over the liquid level 10 contains test gas, e.g. $N_2$ or air, with pressure p and temperature T at ambient atmospheric conditions.

The housing 110 contains brackets 115 supporting an inclined pipe 120 with a first, lower end 121 at the left of the drawing, and a second, upper end at the right. A small circle under the first end 121 and another small circle within the inclined pipe 120 at a bubble counter 140 illustrate gas bubbles entering and rising gently through the inclined pipe 120 during a test period.

Specifically, the inner walls of the inclined pipe 120 enhances coalescence of small gas bubbles into bubbles with diameter approximately equal to the inner pipe diameter. The inclination is a compromise between coalescence, which benefits from longer time and smaller inclinations, and adhesion of gas to the pipe walls, which may become a problem if the inclination is too small. In the drawings, the inclination of pipe 120 is 10° relative to the liquid level 10. In real embodiments, the inclination of pipe 120 depends on the viscosity of the liquid in the housing 110, and may be significantly different from the example 10°.

The upper end of the inclined pipe 120 is connected to a gas-collecting chamber 122, hereinafter the chamber 122 for short. In use, a leak causes a volume V(t) of test gas with an overpressure $\Delta p$ over ambient pressure p to collect in the chamber 122. FIG. 1 shows an exaggerated gas volume V for illustration.

The shape of chamber 122 is arbitrary. However, the inclined pipe 120 is preferably connected to the bottom of the chamber 122 in order to minimize or avoid a dead volume of liquid without function. In use, the chamber 122 is fully submersed in all embodiments of the leakage meter such that liquid may replace test gas in the chamber 122 whenever needed.

A manometer comprising a U-shaped water trap 123 and a vertical pipe 124 is connected to the chamber 122. An open, upper end of the vertical pipe 124 is exposed to gas pressure p over the liquid level 10. Note that the liquid level in the vertical pipe 124 varies over a much shorter distance h(t) than the heights 53.5 cm and 13.4 cm from examples in the introduction.

The bubble counter 140 counts bubbles in the inclined pipe 122 as they pass. We consider bubbles/min at STP as a unit of measure equivalent to units of ml/min, ml/s, etc. In particular, the actual bubbles may be adapted to a desired resolution and the bubble count converted to units of 'standard bubbles'/min, ml/min or some other unit of choice.

For a numerical example, a bubble with volume 1/16 ml=62.5 µl corresponds to a sphere with diameter 4.92 mm. This might suggest an inner diameter 4.92 mm of the inclined pipe 120. However, a desired additional decimal of precision and available standard sizes for pipes might suggest an inner diameter 2.0 mm, which may contain a spherical bubble 4.2 µl. Corrections due to gas pressure p and gas temperature T will be described later.

A level indicator 141 measures a difference level $\Delta h(t_i)$ =$h(t_i)-h(t_j)$ at discrete times ti and tj during each test period. The measurements are not necessarily performed at regular intervals i$\Delta$t. The first measurement $h(t_S)$ is at is when the test period starts. Subsequent measurements are relative to $h(t_S)$ rather than to the liquid level 10. Thus, there is no need for an accurate liquid level 10. The liquid just needs to cover the chamber 122. In particular, the actual liquid level 10 may deviate at least a few mm from a nominal filling level without affecting measurements significantly.

An optical version of the level indicator 141 may comprise a light source such as a LED laser, a light detector, a collimating and/or magnifying lens 142 and a binary ruler 143. For use with optics, the binary ruler 143 may be a sheet of cardboard, plastic or metal with a printed or cut out pattern to be described with reference to FIG. 4. Ambient conditions do not significantly affect the binary ruler 143.

Usually, ambient conditions do not affect the function of light sources, detectors or electronic circuits in optical versions of the bubble counter 140 or the level indicator 141. In comparison, vapor may condensate on a lens such as the lens 142, and reduce visibility and functionality if the lens is colder than the liquid within the housing 110. For example, outdoor temperatures at or below 0° C. occur naturally in large parts of the world, and pure water in the housing 110 might be heated under such conditions. To avoid problems with condense, it is possible to keep the lens 142 at a temperature close to the liquid temperature, or use some principle other than optics in the bubble counter 140 or level indicator 141. Low power commercial devices using electric conductivity, resistance or capacitance may be viable alternatives even in Ex-areas.

Smaller bubbles, e.g. 2 mm bubbles, increases resolution and reduces the risk for false positives caused by counting undersized bubbles. For example, a 2 mm bubble with volume 4.2 µl provide better resolution than a bubble with 1/16 ml=62.5 µl. N bubbles less than 2 mm cause an error much less than N·4.2 µl. For comparison, N bubbles less than 1/16 ml, each assumed to be 62.5 µl, cause larger deviations. Opposite, 2 mm bubbles increases the risk for bubble trains, for example a 'bubble' longer than 2 mm in an inclined pipe 120 with inner diameter 2.0 mm. A bubble train with ten 2 mm bubbles corresponds roughly to 20 mm liquid column in a pipe 124 with 2.0 mm inner diameter.

Before each test period, the gas release valve 150 at the top of chamber 122 may open fully to ensure that liquid completely replaces gas in the chamber 122. During each test period, the gas release valve 150 permits single bubbles to escape from the chamber 122, but delays a bubble train or burst of test gas long enough to estimate the amount of gas in the bubble train by means of the manometer 123-124 and the level indicator 141-143.

Figure 3:
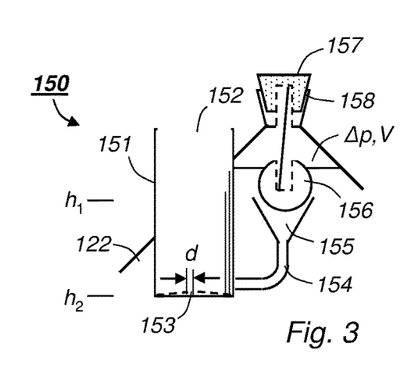
FIG. 3 illustrates a check valve suitable for use within the leakage meter in FIG. 1.

It is possible to achieve this functionality by means of a simple control loop with an electronic pressure sensor and a solenoid valve. However, electronic pressure sensors have disadvantages discussed in the introduction. FIG. 1 illustrates an embodiment of the gas release valve 150 based on a buoyancy that disappears if or when the gas volume Vin chamber 122 becomes too large. FIG. 3 is a detailed view of the gas release valve 150.

If the devices 140 and/or 141 are optical devices, at least part of the pipes 120 or 124 must be transparent. There are no large loads on the internal components 120-124, so a transparent thermoplastic, for example PET or acrylic glass, may be a suitable material for one or more of these components. Further beneficial properties of thermoplastic polymers, e.g. mechanical and chemical properties as well as the recyclability of PET are available online and in literature.

An optional flow divider 130 is essentially a valve able to divide a flow or a pressure into a large and a small part. A first purpose is to prevent inadvertent expulsion of liquid from the inclined pipe 120 and/or the housing 110. For this, the divider 130 initially leads the entire flow from the inlet 101 through a bypass pipe 132. Before the test period starts, part or all of the flow from the inlet 101 is diverted to the inlet pipe 131 by means of a flow actuator 133, in the drawings illustrated by a lever arm with a ball on a distal end. Carefully opening for flow through the inlet pipe 131 prevent the undesired expulsion of liquid. As mentioned in the introduction, the upstream pressure valve in Wilson's test device may be opened slowly and carefully for the same purpose.

A second purpose of the flow divider 130 is to estimate leaks larger than the maximum leaks required for approval or certification. Assume, for example, maximum allowed leaks as in previous examples and a flow significantly larger than 3.5 ml/min through the inlet 101. We want to estimate the larger leak even if the chamber 122 is designed for leaks less than or equal to 3.5 ml/min. The flow divider 130 divides the incoming flow into an inlet flow through the inlet pipe 131 and a bypass flow through the bypass pipe 132. The actuator 133 controls the ratio of inlet flow to bypass flow, preferably in predetermined steps. This will be further explained with reference to FIGS. 9-11.

Before we continue with the description of the drawings, we introduce a few more definitions and make some general remarks.

We have already defined $t_S$ as the start time of a test period, and now introduce $t_E$ as the end time. The duration of a test period is $T_{test}=t_E-t_S$. Formally, a parameter such as p(t), h(t) or T(t) during a test period might be denoted $(\cdot)(t-t_S)$. We use the convention that t is reset to zero at the start of each test period such that $(\cdot)(t-t_S)=(\cdot)(t)$ for $0<t<T_{test}$.

All embodiments of the proposed leakage meter have a 'pass or fail' mode, in which 'fail' means that the amount of test gas collected during the test period $T_{test}$ exceeds a limit volume $V_{limit}$. For example, $T_{test}=3$ minutes times 3.50 ml/min give $V_{limit}=10.5$ ml, and the unit to be tested fails the pressure test if V(3 min)>10.5 ml in this example.

Preferred embodiments perform additional measurements during each test period.

Ideal gas laws adequately describe conditions in real gases at pressures and temperatures occurring in gas pressure tests. A common form is, in SI units:

$$pV=nRT \tag{1}$$

where p is pressure in Pa, V is gas volume in m³, n is the number of mols, R=8.314 J/(mol·K) is the universal gas constant, and T is the temperature in K.

From (1), it follows immediately that the number of mols $$n=pV/RT \tag{2}$$

It may be convenient to use n from equation (2) in external systems because it facilitates comparison between measurements taken at different locations and/or at different times. In particular, n for a particular measurement 'includes' the gas ratio pV/T.

In some numerical examples below, we use resolutions 1 Pa and 1 K. Resolutions in units of hPa (mbar) and 1 K (° C.) are widely used in practice. Inexpensive barometers and thermometers with these resolutions are available for manual or automatic measurements. However, the skilled person knowing the problem at hand must determine the precision and resolution for p, V and T for use in real embodiments.

For illustration of equation (2), 4.5 ml gas at 1 atm=101325 Pa and 20° C.=293 K contains $n=101325 \cdot 4.5 \cdot 10^{-6}/(8.314 \cdot 293)$ mol=187.18 µmol. Further, the ideal gas is a good approximation to real gases under all conditions of interest, so n is independent of test gas.

Storing and using n for comparisons does not exclude storing and using other parameters. For example, ambient temperature and/or icing may be a suspected cause of deviation for a particular type of valve to be tested. Accordingly, '(ambient) temperature' may appear in an 'Environment' branch in an Ishikava diagram for the valve to be tested, and be mandatory in a test schema for this reason and/or because T is needed to adjust gas volumes.

A standard volume $V_0$ at STP can be computed as $V_0=nRT_0/p_0$. However, 'standard' temperature and pressure depend on local definitions. Varieties include $T_0=273$ K (0° C.) or 293 K (20° C.), and $p_0=1$ bar=1000 hPa ($10^5$ Pa) or 1 atm=1013.25 hPa=760.00 mmHg.

It is necessary to convert gas volumes V measured at p and T into $V_0$ or $V_{limit}$ at STP. For this, we rewrite equation (1) as:

$$V_0=(p/T)(T_0/p_0)V \quad (3)$$

To illustrate scale of volume corrections, we assume ambient pressure p in the range 920-1050 hPa, which is within recorded atmospheric extremes at 887 hPa and 1085 hPa. Further, we assume T in the range 0-50° C., which also may occur naturally, e.g. if equipment is exposed to sunshine for an extended period. Further, some pressure test standards specify specific temperatures or temperature ranges, e.g. 38° C. (100° F.) or 5-50° C.

In this example, we use $T_0/p_0=293/1013.25$ K/hPa. Using limits from the previous paragraph, p/T ranges from 920/323 to 1050/273 hPa/K. From (3), it follows that $V_0$ or $V_{limit}$ varies from 0.82 V to 1.11V in this example. Regardless of whether these ranges and numbers are representative, they illustrate that corrections of measured volume V to 'standard' volume $V_0$ may approach 10-20%, and thus that volume corrections according to equation (3) are significant and necessary.

Next, we consider the vertical position of the bubble counter 140. A bubble at the bubble counter has gas pressure p+Δp, where $$\Delta p=\rho gh \quad (4)$$

Similar to parameters shown in FIG. 1, Δp is an overpressure over ambient pressure p and h is a height relative to the liquid level 10. As usual, ρ is liquid density and g≈9.8 m/s². In this example, the bubble counter 140 is a fixed distance from the liquid level 10, so the relative difference Δh between measurements at different times is not relevant.

The ratio $V/V_0=(p_0/T_0)T/(p+\rho gh)$ is independent of bubble size, and thus a useful measure for the effect of counting bubbles at different depths h. Table 1 shows results with density ρ(T) for pure water at h=0, 10, 20 and 30 mm.

TABLE 1

| Effects of ambient p and T compared to depth of measurement within housing 110. | | | | |
|---|---|---|---|---|
| h/mm | 0 | 10 | 20 | 30 |
| 4° C., 1050 hPa | 0.979 | 0.978 | 0.977 | 0.976 |
| 4° C., 920 hPa | 1.117 | 1.116 | 1.115 | 1.114 |
| 50° C., 1050 hPa | 1.142 | 1.141 | 1.140 | 1.139 |
| 50° C., 920 hPa | 1.303 | 1.302 | 1.300 | 1.299 |

The first row in Table 1 contains values of h in mm, and the first column contains values for temperature and pressure in each row. Each cell in the rest of Table 1 contains values of $V/V_0=(p_0/T_0)T/(p+\rho gh)$ to 3 decimals We have used $p_0/T_0=101325/273$ Pa/K, ρ=1000.00 kg/m³ at 4° C. and ρ=988.05 kg/m³ at 50° C. The acceleration of gravity g=9.81 m/s² in this example.

Starting with the column for h=0, it appears that $V/V_0$ increases from 0.979 to 1.303 with increasing T and decreasing p. Following each row, it appears that $V/V_0$ decreases with approximately 1/1000 per cm added depth in pure water. In practice, this means that a deviation plus/minus a few mm from a nominal liquid level over the bubble counter 140 has little effect on bubble sizes and fail criteria. A similar result applies to overpressure Δp in the chamber 122. As before, values of p and T do affect gas volumes significantly.

Bubble sizes at the bubble counter 140 are expected to vary about a mean value, e.g. measured volume V=4.2 µl from a previous example. Adding bubble volumes reduces uncertainty because deviations from the mean in both directions tend to cancel each other. Sample mean and (signed) sample variance from basic statistics provide estimates for mean and variance if one desires concrete numbers. In such methods, 'outliers' such as bubble trains containing several bubbles may be replaced by a maximum bubble size, e.g. corresponding to 5 or 10 bubbles. The latter requires a bubble counter able to estimate bubble sizes to a certain degree, not necessarily accurately. Techniques using a camera may achieve this.

For a slightly more theoretical example, consider two abstract sensors. The first sensor corresponds to the bubble counter 140, and adds 1 to a bubble count whenever it detects a bubble, regardless of bubble size. The second abstract sensor provides the gas volume in a bubble train whenever a bubble train arrives. The second sensor corresponds to the arrangement with gas release valve 150, manometer 123-124 and level indicator 141.

The Kalman filter (KF) mentioned in the introduction is a mathematical model outside the scope of the present invention. However, for the later description it is useful to know that a KF can provide accurate estimates from quite coarse measurements. In essence, whenever a measurement arrives, the KF multiplies the measurement with a weight K and a predicted value with a weight (1−K) to obtain a weighted sum. In a formal KF, the Kalman gain K is a matrix. Here and in a modular KF, the first abstract sensor has a scalar Kalman gain $K_1$ and the second abstract sensor a Kalman gain $K_2$. The gains $K_1$ and $K_2$ change over time and quantify the confidence to put on measurements relative to predictions.

Figure 2:
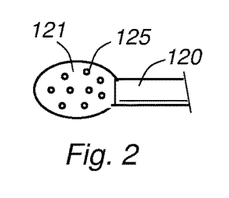
FIG. 2 is a bottom view of a first end of an inclined pipe.

Incidentally, Poisson processes may conveniently model the first and second abstract sensors for a KF or SPC. We refer the interested reader to Kelly (2006) for a comprehensive description of a modular KF. Kelly (2006) also contains a collection of statistical formulas and derivations that may be used or useful in an external system FIG. 2 shows a first end 121 of the inclined pipe 120 seen from below. During operation, a wide shallow spoon shape ensures that test gas is collected and fed into the inclined pipe 120. Studs 125 enhance coalescence of tiny amounts of test gas into bubbles. The studs 125 may be omitted and/or replaced by other means known to promote coalescence.

FIG. 3 is a detailed view of the gas release valve 150 shown in FIG. 1, and we describe FIG. 3 in the context of FIG. 1 during operation.

Before each test period, liquid enters a pilot chamber 151 through a permanently open refill opening 152. A liquid release orifice 153 in the bottom of the pilot chamber 151 provides a delay in a state described below. Before each test period, liquid enters the chamber 122 partly through the liquid release orifice 153, but mainly through a filling pipe 154 leading to a first seat 155. In FIGS. 1 and 3, the first seat 155 has the shape of a truncated cone or funnel. Liquid entering through the filling pipe 154 provides buoyancy for the float 156, which lifts a valve element 157 from a second seat 158 enabling gas in the top of chamber 122 to escape. This is the normal situation when bubbles arrive one by one.

If a burst of test gas arrives, the buoyancy from the float 156 becomes less than a threshold value. A level $h_1$ illustrate the minimum amount of liquid in the chamber 122 providing the buoyancy needed to keep the valve 150 open. If or when a bubble train or burst of test gas suddenly increases the gas volume, the buoyancy disappears such that the spherical float 156 falls into the cone or funnel, engages the conical wall and thereby temporarily prevents test gas from escaping through the filling pipe 154. At the same time, the valve element 157 drops a short distance onto the second seat 158 to prevent test gas from escaping through the top. The shapes of the elements 156 and 157 and their respective seats 155 and 158 may be altered without inventive effort.

When the liquid level in chamber 122 is below $h_1$, i.e. when the buoyancy is too small to keep the gas release valve 150 open, liquid slowly enters the gas volume in chamber 122 through the orifice 153. Liquid entering through the refill opening 152 replaces liquid leaving through the liquid release orifice 153.

The liquid release orifice 153 causes a delay that depends on several factors, e.g. orifice geometry, viscosity of the liquid and a depth $h_2$ from the liquid level 10 to the orifice. A practical way to determine a suitable delay is to test different orifice diameters d for a given liquid at an approximate depth $h_2$. There is no need for an accurate delay. The delay just has to be long enough to perform the necessary measurements of $\Delta h$ in pipe 125, and short enough to allow gas from the bubble train to escape before the next (few) bubble(s) arrive. Recall that that some known external systems, e.g. a KF, may compensate for measurement errors. In the present context, the gas volume in chamber 122 is proportional to the difference $\Delta h$ between liquid levels in the vertical pipe 125 before and after the bubble train arrived.

From the description in the past few paragraphs, it follows that a main purpose of the pilot chamber 151 is to provide walls for the liquid release orifice 153 and the pipe 154. Thus, the pilot chamber 151 may have any shape, and the refill opening 152 may be an open top of a cylinder or simply be a hole in the wall of chamber 122.

The bottom of the pilot chamber 151 is preferably slightly conical with apex up to avoid a gas trap under the pilot chamber 151. Dashed lines extending downward from either side of the orifice 153 illustrate such a conical bottom of the pilot chamber 151.

Further, since the buoyancy from float 156 must carry the weight mg of the valve element 157, the mass m of element 157 is preferably small. Since the valve element 157 is submersed during operation, it should have a density slightly greater than the liquid density. For example, acrylic glass has density 1.16-1.18 g/cm$^3$, which is slightly greater than the density of water with or without additives around 1.0 g/cm$^3$. It follows that reducing the mass of the valve element 157 amounts to reducing its size. Since small spheres are cheaper to make and less sensitive to orientation than small, truncated cones, a sphere may obviously replace the frustoconical valve element 157 shown in FIG. 3.

In FIG. 3, a stiff rod transfers lifting force from the float 156 to the valve element 157. The rod is shown as a straight line inclined 5° to the vertical inserted into cylindrical bores in the float 156 and the valve element 157. The bores are wide relative to the rod to reduce the need for accurate horizontal alignment of these elements and their respective seats.

Preferably, the stiff rod is unconnected or flexibly connected to at least one of the elements 156 and 157. In use, this allows the float 156 and the valve element 151 to sink or fall into their respective seats 155 and 158 at different speeds.

Figure 4:
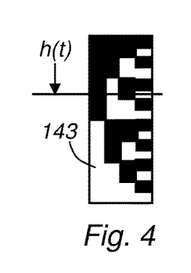
FIG. 4 illustrates a binary ruler for an optical level sensor.

FIG. 4 illustrates a binary ruler 143. Binary rulers for use with optical readers usually have a pattern printed on a suitable material such as cardboard, metal or plastic. Alternatively, binary rulers for use with optical readers may comprise an opaque material with punched out, transparent fields. The example in FIG. 4 has four columns, where white means '0' and black means '1'. A level h(t) crosses a unique pattern, in FIG. 4 'black, white, black, white', which for h(t) in FIG. 4 is interpreted as binary $1010=1\cdot2^3+0\cdot2^2+1\cdot2^1+0\cdot2^0=10$ $(=1\cdot10^1+0\cdot10^0)$ in decimal numbers.

The rightmost column defines the resolution, e.g. by alternating white and black rectangles each 1.0 mm high. To achieve better resolution, a column with alternating white and black rectangles each $2^{-1}=\frac{1}{2}$ mm high would be added to the right hand side of the binary ruler in this example. Similarly, it is obviously possible to add columns to the left hand side of the binary ruler 143 to represent $2^4$, etc.

Later during the test period, we assume that a new level $h(t+i\Delta t)$ is detected at the pattern 'black, black, white, black' corresponding to binary 1101=13 decimally. At 1 mm resolution, the difference $\Delta h=h(t+i\Delta t)-h(t)=(13-10)$ mm measures a pressure change in the chamber 122 independent of the liquid level 10. A 3.0 mm column of pure water at 4° C. corresponds to a change $\Delta(\Delta p)=10^3$ kg/m$^3\cdot9.8$ m/s$^2\cdot3.0\cdot10^{-3}$ m=29.4 Pa. In general, a resolution 1 mm water column corresponds to a fine pressure scale about 10 Pa=0.1 hPa.

Incidentally, the binary ruler 143 is similar to a binary search from left to right, and the principle is by no means new. The 'binary principle' is widely used in non-optical sensors.

Figure 5:
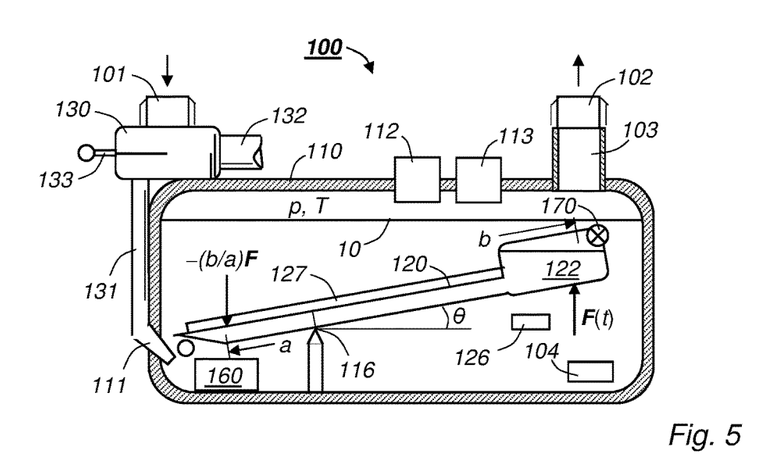
FIG. 5 illustrates a second embodiment of the leakage meter.

FIG. 5 illustrates an alternative embodiment of the leakage meter 100 that utilizes environment control and a lever principle. We do not repeat the description of components 101-111 and 130-133 explained with reference to FIG. 1.

An auxiliary chamber 103 attached to the housing 110 illustrates one or more spaces fit to contain equipment and components as required. Such a chamber without reference numeral contains the upper end of the vertical pipe 124 in FIG. 1.

An internal environment conditioner 104 represents elements to alter conditions within the housing 110, for example, a heating element and/or a pressure regulator. In terms from control theory, the conditioner 104 is an actuator in a control loop. A temperature sensor 112 and/or a pressure sensor 113 may provide an associated feed forward or feedback.

In general, internal conditions such as temperature, pressure, humidity etc. may be different from corresponding conditions in the surrounding atmosphere. This approach minimizes adverse effects of atmospheric conditions rather than correcting for them. Insulation, tightness and other features of the housing 110 should of course be adapted accordingly.

Regardless of internal temperature, the pressure p may be equal to or very close to atmospheric pressure. For example, a gas tight housing 110 may comprise a bellow, a flexible membrane or other gas tight means to equalize internal and atmospheric pressure p. Further, internal pressures p (+ ·p) and temperature T will be different from STP in most cases.

The temperature sensor 112 represents sensors to measure any temperature of interest, for example, gas and liquid temperatures within the housing 110 and/or the temperature of the atmosphere surrounding the leakage meter 100. The temperature sensor 112 supplies data to downstream information systems automatically as opposed to manual measurements entered by means of a keyboard.

For example, a control system may comprise a heater that changes liquid temperature faster than atmospheric temperature. The control system may need an automatic temperature sensor 112, whereas manual measurements may suffice for atmospheric temperature.

A major benefit of environment control in the housing 110 is an ability to use sensors calibrated for a narrow range of conditions. For example, the electronic pressure sensor 113 may be accurate to within 0.1 hPa (0.1 mbar) within a controlled, narrow temperature range.

As in FIG. 1, the inclined pipe 120 is attached to the bottom of the chamber 122. However, the chamber 122 in FIG. 5 may be considerably larger than needed to contain a bubble train, for instance permitted leaks 1.5 ml/min×3 min=4.5 ml or 3.5 ml/min×3 min=10.5 ml compared to $^{10}/_{16}$=0.625 ml plus a small safety margin.

Contrary to the embodiment in FIG. 1, the inclined pipe 120 in FIG. 5 can tilt about a pivot 116. A stopper 126 under the chamber 122 ensures that the inclined pipe 120 leads test gas toward the chamber 122 at all times, i.e. that an angle θ between the inclined pipe 120 and a horizontal plane is always greater than zero. As before, a minimum angle θ reduces the risk for adhesion of test gas to the inner wall of pipe 120, especially at small leaks.

A lever 127, e.g. a thin beam or sheet with its smallest dimension along the pivot axis, may support the assembly 120-122 if the assembly, in particular the inclined pipe 120, lacks sufficient rigidity. The inclined pipe 120 and the lever 127 may be the same mechanical component, so FIGS. 6 and 7 do not show the lever 127 explicitly. Either way, the pivot 116 divides the lever 127 into a short arm with length a extending toward the first end 121, and a long arm with length b extending toward the chamber 122.

A gas release valve 170 in the top of chamber 122 replaces the gas release valve 150 shown in FIG. 1. If the chamber 122 is designed to collect test gas during the entire test period, it may suffice to open the gas release valve 170 only between test periods in order to replace test gas with liquid in the chamber 122. The gas release valve 170 may be any suitable valve, for example a commercially available solenoid valve certified for Ex-areas or a manually operated valve. We present an energy efficient alternative with reference to FIGS. 8a and 8b.

During operation, a buoyancy force F(t) increases as the volume of test gas in the chamber 122 displaces liquid. The buoyancy force of interest equals the weight of liquid displaced since time $t_S$. With conventions described previously:

$$F(t)=\rho g V(t)-F(0); \; 0<t<T_{test} \quad (5)$$

F(0) is a downward force exerted on the stopper 126 at $t_S$, e.g. when the chamber 122 is filled with liquid and the gas release valve 170 is fully closed. In words, equation (5) states that F(t) becomes less negative as the gas volume V(t) increases. Once the buoyancy from V(t) overcomes F(0), F(t) becomes positive, i.e. directed upwards. For accuracy, F(0) should be as small as practically possible.

By the lever principle, an upward force F at distance b from the pivot 116 exerts a downward force −(b/a)F measured at distance a on the opposite side of the pivot. For example, (b/a)=10 implies that the downward force is ten times the buoyancy force at the chamber 122. This may add a decimal of precision. However, measurement errors will also be multiplied by b/a.

As mentioned in the introduction, some electronic pressure and force sensors are relatively sensitive to temperature. This is not necessarily a concern in a housing 110 heated to a stable temperature, for instance a typical lab temperature near 20-22° C.

Figure 6:
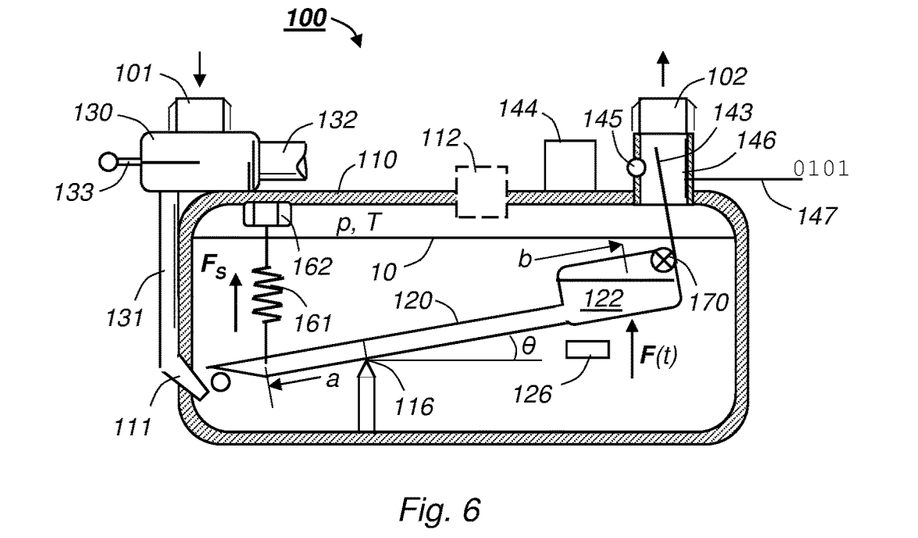
FIG. 6 illustrates a third embodiment of the leakage meter.

FIG. 6 essentially shows the lever in FIG. 5 acting with a 'large' force $F_S$=−(b/a)F on a spring 161. At equilibrium, the spring 161 acts on the lever at a with a force $-F_S$=kx where k is a spring constant and x is a downward extension of the spring in this example. A small downward extension x at a corresponds to a 'large' upward displacement X=−(b/a)x at b. Measuring and adjusting 'large' quantities is a widely used strategy to reduce relative errors.

A dashed line around the box 112 illustrates that the temperature sensor 112 is not necessarily part of the leakage meter 100. As noted, instruments outside the leakage meter may measure the ambient temperature and pressure required for correction of gas volumes.

The spring 161 is a specific embodiment of the force sensor 160 in FIG. 5. It is used as an example in FIG. 6 because the spring extension x has the approximate size of a, b and other typical dimensions in the housing 110, e.g. to within an order or two of magnitude. It is irrelevant that the measured quantity is actually a displacement as long as the displacement represents the force F. For comparison, the element sensing force in another force sensor 160 might be an elastic beam with displacement or strain several orders of magnitude smaller than a, b etc. Here, it is irrelevant that force sensors using strain actually may measure stress, i.e. force per unit area, as long as the output from the force sensor 160 represents force.

An adjustment nut 162 connects the spring 161 to the housing 110. Turning the adjustment nut 162 causes a vertical displacement z, which should not to be confused with the spring extension x. For example, the spring 161 may be a tension spring unable to compress from equilibrium. Then, the entire spring 161 may move downward a distance $z_1$ until it exerts a force −(b/a)F(0) on the lever at a, thereby opposing F(0) in equation (5) to within acceptable limits. In another example, the adjustment nut 162 might cause a downward spring bias $F_{SO}$=$kz_1$ when the adjustment nut 162 moves downward the distance $z_1$. $F_{S0}=(b/a)F(0)$ would also cancel F(0) in equation (5) to within predefined limits.

Either way, we may set F(0)=0 in equation (5) and solve for V(t):

$$V(t)=(k/\rho g)X(t) \quad 0<t<T_{test} \quad (6)$$

where X is a displacement at b adjusted such that X(0)=0 at the start of each test period.

Summarized and neglecting opposite signs on opposite sides of the pivot 116, at a, x(t)=(a/b)X(t) cancels $F_S$=(b/a)F=kx, so the lever ratio b/a does not appear in equation (6). Still, measuring displacement at b does reduce uncertainty by the factor a/b, so the lever ratio is implicit in the apparatus in FIG. 6. Further, the spring constant k determines the ratio V(t)/X(t) and thereby amplification through the factor $k/\rho g$ in eq. (6).

In order to illustrate measurement of vertical displacement at b, we assume a binary ruler 143 as in FIG. 4 where the white fields are transparent and the black fields are opaque. The binary ruler 143 is attached to the chamber 122 at right angles to the inclined pipe 120. A light source 144 and a focusing lens 145 produce a fine focused line across the binary ruler 143. In this example, a light detector 146 has four vertical photosensitive strips such that light passing through a transparent field produces a voltage. Thus, a unique horizontal pattern of opaque and transparent fields produces a unique pattern of voltages from the four strips. A sequence '0101' in Courier normal font illustrates a binary output on line 147. Further treatment of binary and electrical signals is beyond the scope of the present invention, but still well known to those skilled in the art.

Since the binary ruler 143 forms the angle θ with the vertical in this example, the measured height is X(t)cos θ. In practice, θ may be reduced by an angle corresponding to the start position where the chamber 122 touches the stopper 126. This corresponds to a vertical ruler 143 in the start position, i.e. not 90° from the pipe 122 as shown in FIG. 6. Since cos θ≈1 for small angles θ, angle corrections may be superfluous in real embodiments. For example, 15° is relatively large for a 'small' angle, and causes a correction [1−cos(15°)]=0.034 mm for a 1 mm slit in the binary ruler 143. This cosine correction is less than 10% of a height about 0.5 mm of the horizontal line of light produced by a typical focusing lens 145.

Figure 7:
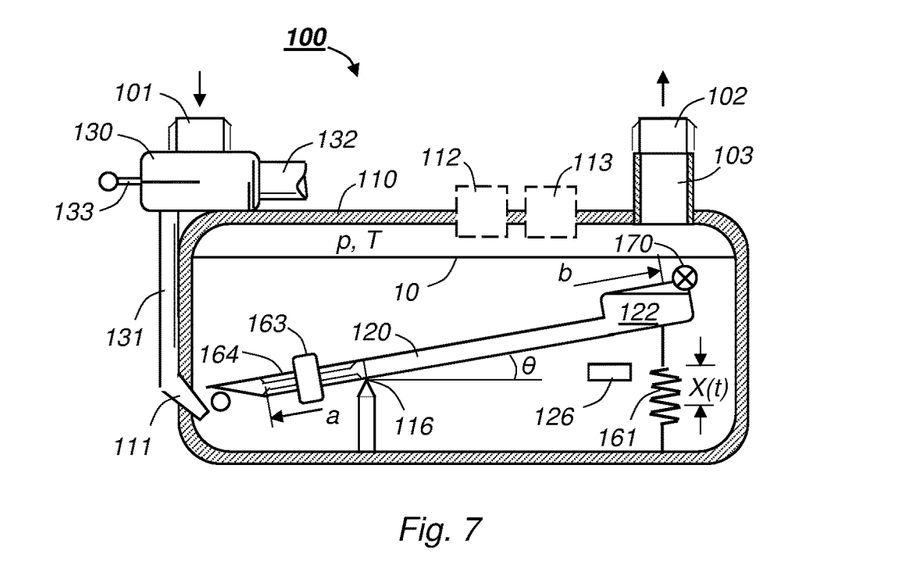
FIG. 7 illustrates a fourth embodiment of the leakage meter.

FIG. 7 shows an alternative embodiment in which the spring 161 is attached to the chamber 122 at b. There is no need to repeat explanations of reference numerals 10-161 and symbols p, T, θ, a, b and x. As before, ambient pressure p and temperature T are required for volume corrections, but the associated temperature and pressure sensors 112, 113 are not necessarily parts of the leakage meter 100.

In FIG. 7, a counter weight 163 can rotate on fine threads 164 on the short arm of the lever, and replaces the adjustment nut 162 shown in FIG. 6. Rotating the counter weight 163 causes an axial displacement that, in effect, alters the lever ratio b/a to exactly oppose the weight of the liquid filled chamber 122 at the start of each test period. In terms defined above, a counter weight 163 with mass m at an adjusted distance a provides a weight mg=(b/a)F(0) that opposes F(0) from equation (5) to within predefined limits.

The skilled person understands that there is no need for both an adjustment nut 162 and a counter weight 163, and further that a lock screw, a jam nut or equivalent means may prevent undesired rotation of either element 162 or 163. Furthermore, any force sensor 160 may replace the spring 161 without inventive effort.

The counter weight 163 and the liquid filled chamber 122 are exposed to the same local acceleration of gravity g, so g cancels in a force equation relating gravity acting on the chamber 122 and the counter weight 163. This principle distinguishes a traditional balance from a traditional scale. As is well known, traditional 'reference weights' for a balance are usually labelled in units of mass, e.g. kg or gram, rather than in units of force such as Newton.

The mass of liquid displaced by a gas volume V(t) within the chamber 122 is pV(t). Moreover, equation (6) indicates that V(t) is proportional to the vertical displacement X at b. As discussed, we may safely neglect the cosine correction at small angles θ. Perhaps more important, equation (6) follows from assumed linear relationships between buoyancy, volume and displacement in the sense that second order effects become insignificant. For the spring 161 or an elastic beam, the linear assumption is equivalent to elastic deformation and Hooke's law. For the volume V(t), a linear relationship to X implies that it suffices to 'measure' the chamber 122 filled with gas and filled with liquid in order to determine a maximum and minimum X. All values in between are proportional:

$$V(t)/(V_{max}-V_{min})=X(t)/(X_{max}-X_{min}) \quad (7)$$

The liquid filled chamber 122 in previous examples corresponds to $V_{min}=0$. However, $V_{min}\neq 0$ is possible in equation (7). Similarly, any $X_{min}\neq 0$ is equivalent provided the difference $X_{max}-X_{min}$ remains constant. Setting $X_{min}=0$ is just a convention.

Measuring mass is generally easier than measuring volume, so the exact volume $V_{max}$ may be determined by filling the chamber 122 with liquid at a known density and measure the mass before and after filling. For a numerical example, we assume a lab and 22° C. at which pure water has density ρ=997.76 kg/m³. Further, we assume that a lab balance measures the difference between masses before and after filling to Δm=5.678 gram independent of local gravity. The internal volume $V_{max}$=(5.678±0.001)/0.99776= (5.691±0.001) ml. In this example, mg precision on a lab balance corresponds to μl precision in volume. This is comparable to the 4.2 μl resolution of a 2 mm bubble.

Figure 8A:
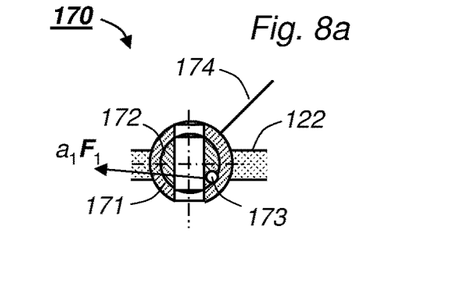
FIG. 8a shows a bi-stable gas release valve in an open state.
Figure 8B:
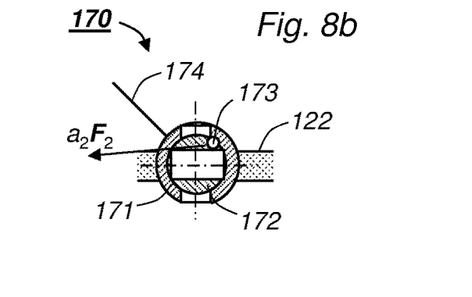
FIG. 8b shows the same bi-stable gas release valve in a closed state.

FIGS. 8a and 8b illustrate a bi-stable embodiment of the gas release valve 170 in an open and a closed state, respectively. The valve 170 has a shell 171 mounted in the top of chamber 122. The shell 171 has a vertical bore and contains a rotatable valve element 172, e.g. a ball or a cylinder. The valve element 172 has a secondary bore, which opens for flow through the valve 170 when aligned with the vertical bore as in FIG. 8a.

FIG. 8a shows the valve 170 in its open state before each test period. Dash-dot lines cross at the valve element's axis of rotation. A spring attached to an eccentric pin 173 acts on the rotatable valve element 172 with a torque $a_1F_1$. As long as the eccentric pin 173 remains below the valve element's axis of rotation, the torque $a_1F_1$ keeps the secondary bore in a vertical position such that the valve 170 remains open.

FIG. 8b shows the valve 170 in its closed state during test periods. In this state, the eccentric pin 173 is above the valve element's axis of rotation, and the spring attached to the eccentric pin 173 acts on the rotatable valve element 172 with a torque $a_2F_2$. As long as the eccentric pin 173 remains above the valve element's axis of rotation, the torque $a_2F_2$ keeps the secondary bore in a horizontal position such that the valve 170 remains closed.

It is understood that the same technical effect is achieved whenever the spring forces $F_1$ and $F_2$ are applied to opposite sides of the valve element's axis of rotation, not necessarily over and under the valve element's axis of rotation.

A lever 174 connected to the valve element 172 is able to rotate the valve element 172 in the shell 171. In FIG. 8a, the lever 174 is directed 45° from a horizontal axis, i.e. upward to the right, when the valve 170 is open. In FIG. 8b, the lever 174 is directed 135° from the horizontal axis, i.e. upward to the left, when the valve element 172 is rotated 90° in order to close the valve. Suitable stoppers (not shown) limit the rotation.

The spring attached to the eccentric pin 173 may be a tension spring attached to the wall of the chamber 122 to the left of components shown in FIGS. 8a and 8b. Alternatively, a compression spring or a torsion spring may provide similar torques $a_1F_1$ and $a_2F_2$. Either way, the spring attached to the eccentric pin 173 provides the force required to keep the valve 170 open or closed. Thus, the only energy required to operate the valve 170 is the work needed to overcome a limited spring force over a short distance separating the two stable states.

In terms of force and distance, factors $a_2/b_1$ and $a_1/b_1$ substantially reduce the force required to open or close the valve if $b_1$ is a lever arm substantially longer than $a_1$ and $a_2$. A longer lever arm $b_1$ along the lever 174 increases the distance over which an actuator has to act on the lever. In terms of power and time, smaller power implies longer time to supply the required energy. Thus, it is possible to operate the bi-stable valve 170 in FIGS. 8a and 8b at low power, e.g. supplied from a battery through a low-power inductive actuator. Note that wires from the housing to the gas release valve 170 might affect weight measurements, and that inductive couplings do not require wires.

Figure 9:
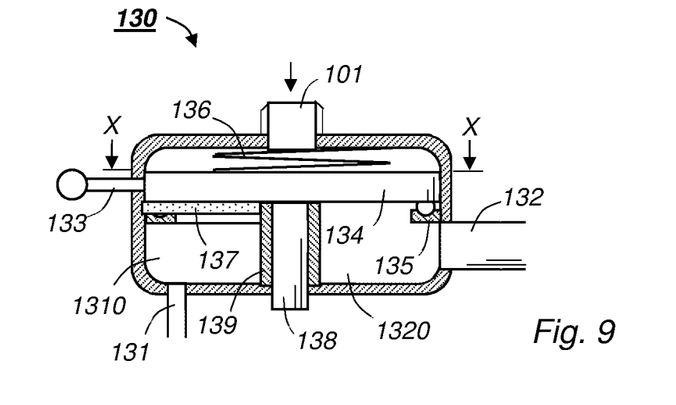
FIG. 9 is a vertical section through a flow divider.

FIG. 9 is a vertical section through the flow divider 130. As explained with reference to FIG. 1, the inlet pipe 131 leads to the inlet nozzle 111, the bypass pipe 132 leads test gas away from the housing 110 and the lever 133 represents an actuator.

The lever 133 is attached to a rotatable dividing disc 134, which in FIG. 9 separates an upper compartment from a lower manifold. In use, the upper compartment receives test gas through the inlet 101. The lower manifold has at least two manifold chambers 1310 and 1320. One or more first manifold chamber(s) 1310 is/are fluidly connected to the inlet pipe 131, and one or more second manifold chamber(s) 1320 is/are fluidly connected to the bypass pipe 132.

The orientation of the flow divider 130 in FIG. 9 is not limiting. Real embodiments may have the manifold chambers 1310, 1320 on a side rather than in the lower part, etc.

The dividing disc 134 may be set in one of several discrete angular orientations by means of protrusions, e.g. pins or balls, fitting in grooves in a raceway 135. A compression spring 136 urges the protrusions into the grooves and the dividing disc 134 against vertical walls within the manifold. A gasket 137 under part of the dividing disc 134 seals for gas with a small overpressure.

A central shaft 138 is attached to the dividing disc 134 and inserted in a sleeve 139 attached to the shell of the flow divider 130. The shaft 138 in the sleeve 139 prevents that the dividing disc 134 tilts relative to the raceway 135. This facilitates using loose balls instead of pins between the dividing disc 134 and the raceway 135.

Figure 10:
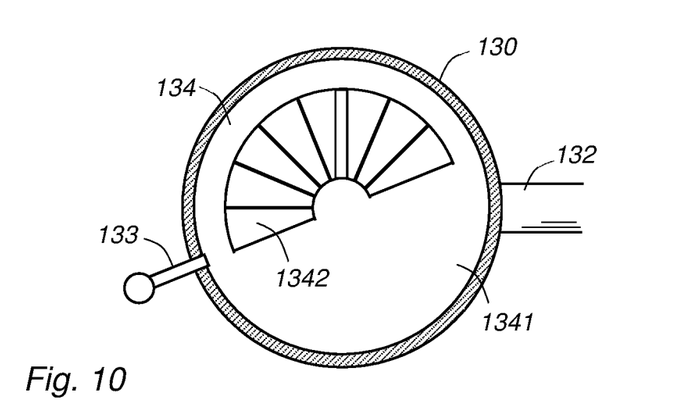
FIG. 10 is a section along plane X-X in FIG. 9 showing a dividing disc from above.

FIG. 10 is a section along plane X-X in FIG. 9, and illustrates the dividing disc 134 viewed from above. The dividing disc 134 has a gas tight closing part 1341 and an open part 1342 through which some internal walls in the lower manifold are visible. A thin rectangle illustrates a mandatory division between the at least two chambers 1310 and 1320. Radial lines illustrate optional internal walls in the lower manifold. In real embodiments, the walls represented by radial lines and by a thin rectangle may have similar designs.

In use, the angular orientation of the dividing disc 134 determines the ratio of amount of test gas entering the chamber 1310 to the amount of test gas entering the chamber 1320. In FIG. 10, this ratio is 5/3 corresponding to five sectors visible through the opening 1342 to the left of the thin rectangle, and three visible sectors to the right of the thin rectangle.

In general, the flow divider 130 diverts a precisely known fraction of a 'large' leak arriving through the inlet 101 to the inlet pipe 131 such that the 'large' leak may be estimated from measurements produced by the leakage meter 100 and the precisely known fraction.

Figure 11:
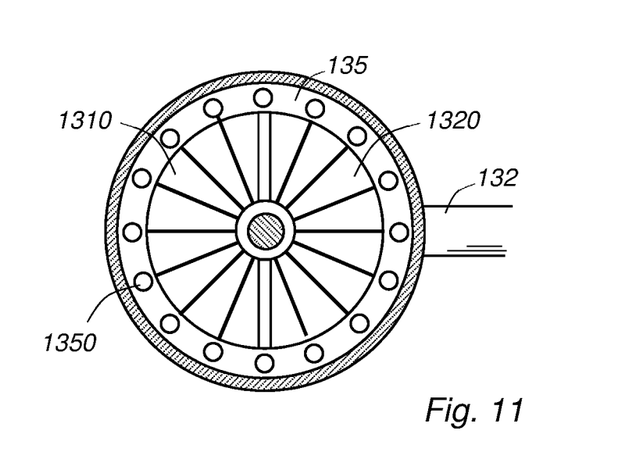
FIG. 11 is a top view of a raceway for the dividing disc in FIG. 10.

FIG. 11 is a top view of a raceway 135 for the dividing disc 134. Grooves 1350 may conveniently be drilled holes with a diameter slightly less than protrusions, e.g. pins or balls, located between the dividing disc 134 and the raceway 135. As best seen in FIG. 9, the spring 136 urges the protrusions into the set of grooves 1350, thereby creating the set of angular orientations.

While the invention has been described by means of examples, the scope of the invention is determined by the following set of claims.

REFERENCES

Alonzo Kelly: "A 3D State Space Formulation of a Navigation Kalman Filter for Autonomous Vehicles", Carnegie Mellon University, Rev 2 2006, original from 1994

The invention claimed is:

1. A gas leakage meter for use onsite in a process plant comprising:
    a housing with an inlet, an outlet and an inlet nozzle fluidly connected to a unit to be tested through a downstream connector and to the inlet, the housing being filled with a liquid to a level; and
    an inclined pipe arranged such that, in use, test gas released from the inlet nozzle raises through a liquid and the inclined pipe to a gas collecting chamber at an upper end of the inclined pipe, wherein the gas-collecting chamber has a gas release valve for releasing test gas before a test period, and wherein the gas leakage meter is equipped with means for measuring test gas.

2. The gas leakage meter according to claim 1, further comprising an internal environment conditioner equipped with means to alter conditions within the housing.

3. The gas leakage meter according to claim 1, wherein the gas release valve has a rotatable valve element with an eccentric pin attached to a spring providing a first torque $\alpha_1F_1$ keeping the gas release valve open when the eccentric pin is located on a first side of the valve element's axis of rotation and a second torque $\alpha_2F_2$ keeping the gas release valve closed when the eccentric pin is located on a side opposite the first side of the valve element's axis of rotation.

4. The gas leakage meter according to claim 1, further comprising a flow divider to divide a flow or a pressure into a large and a small part to prevent inadvertent expulsion of liquid from the inclined pipe, having a first manifold chamber fluidly connected to the inlet nozzle and a second manifold chamber fluidly connected to a bypass pipe outside the housing; the flow divider further comprising a dividing disc with an open section; wherein the dividing disc has several discrete angular orientations relative to the manifold chambers such that, in use, the ratios of test gas flowing through the open section into the first and second manifold chambers are clearly defined.

5. The gas leakage meter according to claim 4, wherein the discrete angular orientations are determined by grooves and associated protrusions at fixed angular positions between the dividing disc and a raceway around the manifold chambers.

6. The gas leakage meter according to claim 1, further comprising a bubble counter configured to count bubbles of test gas within the inclined pipe.

7. The gas leakage meter according to any claim 6, wherein the gas release valve comprises a pilot chamber with a permanently open refill opening, a liquid release orifice in the bottom of the pilot chamber, a filling pipe connecting the pilot chamber to a first seat, a float able to close the first seat if a buoyancy acting on the float is less than a threshold value and able to lift a valve element from a second seat if the buoyancy is equal to or greater than the threshold value.

8. The gas leakage meter according to claim 6, further comprising a water trap connecting the gas-collecting chamber to a vertical pipe.

9. The gas leakage meter according to claim 8, further comprising a level indicator configured to measure a liquid level in the vertical pipe.

10. The gas leakage meter according to claim 1, further comprising a lever that can tilt about a pivot, the pivot dividing the lever into a short arm extending toward a lower end of the inclined pipe and a long arm extending toward the gas-collecting chamber, wherein lever may support assembly if the assembly lacks sufficient rigidity; the gas leakage meter further comprising a force sensor configured to measure a buoyancy F (t) caused by test gas in the gas-collecting chamber.

11. The gas leakage meter according to claim 10, wherein the force sensor is located at the short arm of the lever.

12. The gas leakage meter according to claim 10 wherein the force sensor is located at the long arm of the lever.

13. The gas leakage meter according to claim 10, wherein the means to cancel the weight of the gas-collecting chamber is a counter weight axially movable along the short arm of the lever.

14. The gas leakage meter according to claim 10, further comprising means to cancel the weight of the gas-collecting chamber at the start of each test period.

15. The gas leakage meter according to claim 14, wherein the means to cancel the weight of the gas-collecting chamber is an adjustment nut able to move a spring axially and/or to provide a spring bias by means of the spring.

* * * * *